United States Patent [19]

Stone

[11] Patent Number: 5,078,468

[45] Date of Patent: Jan. 7, 1992

[54] N×N OPTICAL STAR COUPLER

[75] Inventor: Julian Stone, Rumson, N.J.

[73] Assignee: AT&T Bell Laboratories, Murray Hill, N.J.

[21] Appl. No.: 690,875

[22] Filed: Apr. 24, 1991

[51] Int. Cl.$^5$ .............................................. G02B 6/40
[52] U.S. Cl. ..................................... 385/116; 385/46; 385/60
[58] Field of Search ................ 350/96.22, 96.24, 96.25

[56] References Cited

U.S. PATENT DOCUMENTS

| | | | |
|---|---|---|---|
| 4,139,260 | 2/1979 | Bouygues et al. | 350/96.22 |
| 4,272,156 | 6/1981 | Ishibashi et al. | 350/96.24 |
| 4,529,267 | 7/1985 | Nishioka et al. | 350/96.25 |
| 4,758,065 | 7/1988 | Dorman et al. | 350/96.24 |
| 4,904,042 | 2/1990 | Dragone | 350/96.16 |
| 4,929,070 | 5/1990 | Yokota et al. | 350/96.24 |

OTHER PUBLICATIONS

Optical Fiber Communication Conference, San Francisco, Jan. 22-26, 1990.

Primary Examiner—William L. Sikes
Assistant Examiner—Robert E. Wise
Attorney, Agent, or Firm—Eli Weiss

[57] ABSTRACT

This invention is a highly efficient star coupler for use with single mode waveguides. In the inventive coupler, all of the input waveguides and all of the output waveguides are assembled to form two separate bundles. The two bundles are axially aligned with each other and the ends of the bundles are spaced apart. The ends of the waveguides of the bundle of output waveguides are polished to receive optical energy from the bundle of input waveguides. The end facet of the input waveguide bundle is shaped and polished to form a convex spherical surface. The diameter of each waveguide of the bundle is small relative to the diameter of the bundle of waveguides. Therefore, the end facet of each waveguide which makes up the convex spherical surface is angled very slightly relative to the waveguide axis. This slight angle on the end facet of the waveguide acts as a bevel to bend the optical energy coming out of the end of the waveguide. The shape of the end facets of the input waveguides and the spacing between the ends of the input and output waveguides are selected to enable the optical energy from each input waveguide to shine on all of the end facets of the output waveguides with substantially no spill-over of optical energy. To increase the efficiency of the device, the packing density of a bundle of waveguides can be improved by decreasing the size of the cladding of the waveguides and/or increasing the diameter of the core with an adiabatic taper.

10 Claims, 5 Drawing Sheets

N×N OPTICAL STAR COUPLER

TECHNICAL FIELD

This invention relates to optical star coupler-devices for simultaneously distributing optical signals from each of N sources to each of N detectors and to optical communication systems comprising such star coupler.

BACKGROUND OF THE INVENTION

A key component in many architectures of high speed, optical signal distribution systems is a single mode fiber passive star coupler. Under ideal conditions, a star coupler having N inputs and N outputs, hereinafter referred to as an N×N star, divides the power entering any of the N input ports equally between all of the N output ports. Naturally, there is some loss of power within the star coupler due to absorption and scattering. The N×N star coupler can be used as the central node of a high speed, optical, local-area network where each user can be connected by two fibers-one for transmission to the input side of the star, and the other for reception from the output side of the star. This arrangement creates a broadcast type of local area network where a message which is transmitted by any user can be received by all users. In use, different messages can be transmitted and received simultaneously by the various users through the application of any of a number of protocols such as wavelength division multiple access or time division multiple access.

A simple 2×2 star coupler is a 3 db coupler which comprises two fibers which share their optical power at a point of proximity. Such structures are made by etching, grinding and polishing, or fusion techniques. Such 2×2 stars can be ganged together to provide larger N×N stars, where N is any arbitrary power of two. When multimode waveguides are used, the star coupler can be a glass element with each subscriber's output connected at one side of the element, and each subscriber's access line connected to the other side of the element.

In one prior art arrangement disclosed in U.S. Pat. No. 4,904,042, the coupler input and output waveguide facets are arranged in circular, input and output arrays. The center of curvature of the circle segment which defines the input array facets lies on the circle segment which defines the output array facets, and vice versa. The axes of the waveguides in each array are directed to the center of curvature of the circle defining the configuration of that array. The radius of the circles defining the configuration of each array is selected to maximize the transmission from the marginal input element to the marginal output elements. The aperture of each of the elements may be further varied from element to element to maximize the efficiency of the array.

In the arrangement of U.S. Pat. No. 4,904,042, the input and output array lie in a single plane. Thus, the number of waveguides in the input and output arrays are limited to the number of waveguides that can be positioned side-by-side in the circular array.

A major disadvantage of the star coupler system is associated with the fact that the signal from each input waveguide must be distributed among all of the output waveguides. Accordingly, power considerations are important as the power from each input waveguide is divided among all of the output waveguides. Additionally, single mode star couplers having multitudes of input waveguides and multitudes of output waveguides require large numbers of ganged, stacked or cascaded directional couplers. Such couplers are not only extremely difficult to fabricate, but are economically prohibitive and relatively large in size.

SUMMARY OF THE INVENTION

This invention is a highly efficient star coupler for use with single mode waveguides. In the inventive coupler, all of the input waveguides and all of the output waveguides are assembled to form two separate bundles. The two bundles are axially aligned with each other and the ends of the bundles are spaced apart. The ends of the waveguides of the bundle of output waveguides are polished to receive optical energy from the bundle of input waveguides. The end facet of the input waveguide bundle is shaped and polished to form a convex spherical surface. The diameter of each waveguide of the bundle is small relative to the diameter of the bundle of waveguides. Therefore, the end facet of each waveguide which makes up the convex spherical surface is angled very slightly relative to the waveguide axis. This slight angle on the end facet of the waveguide acts as a bevel to bend the optical energy coming out of the end of the waveguide. The shape of the end facets of the input waveguides and the spacing between the ends of the input and output waveguides are selected to enable the optical energy from each input waveguide to shine on all of the end facets of the output waveguides with substantially no spillover of optical energy. To increase the efficiency of the device, the packing density of a bundle of waveguides can be improved by decreasing the size of the cladding of the waveguides and/or increasing the diameter of the core with an adiabatic taper.

DETAILED DESCRIPTION

This invention relates to star couplers which are used in optical communication systems to interconnect each subscriber to a plurality of other subscribers of a telecommunication system. A schematic representation of an exemplary prior art star coupler is illustrated in FIG. 1.

Figure 1:
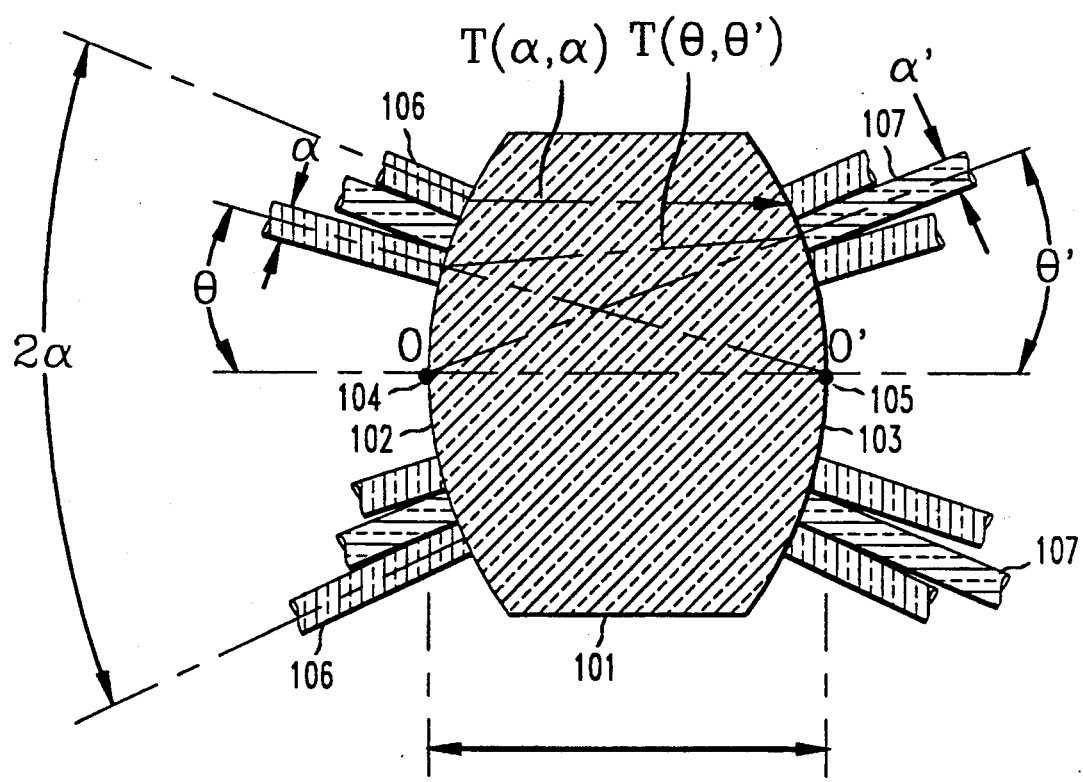
FIG. 1 is a schematic representation of a prior art star coupler.

In FIG. 1, the star coupler can comprise a slab of relatively low loss material 101, usually dielectric, capable of guiding optical power supplied by input waveguides 106. The perimeter of the star coupler, 102 and 103 approximates segments of two circles, respectively. Each circular segment passes through the center of curvature of the circle associated with the segment as shown at 104 and 105. Thus, segment 102 passes through point 104, which is the center of curvature of the circle associated with the other circular segment 103.

The input single mode waveguides 106 form an array oriented along one of the circular segments 102 and directs optical energy into the coupler. N fibers, of which six are illustrated, form the array. Similarly, N aperture elements, which are output single mode waveguides, form an array oriented along segment 103. These are illuminated by the radiation passing through the coupler and extract optical radiation from the couplers. The axes of each of the waveguides of a given array are substantially directed toward the center of curvature of the circle associated with the segment about which those waveguides are oriented. Thus waveguides 106 are oriented with their axes directed toward point 105, the center of curvature of the segment 102 of a circle.

Figure 2:
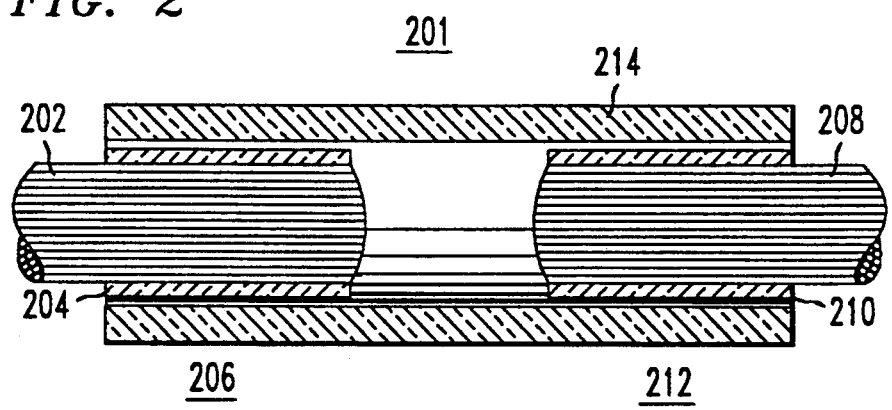
FIG. 2 is a simplified schematic representation of a star coupler in accordance with the principles of the invention.

Referring to FIG. 2, there is illustrated a star coupler in accordance with the principles of the invention. The inventive star coupler 201 can comprise a plurality of single mode optical waveguides 202 assembled to be substantially parallel to each other at the end and located within a sleeve 204 to form a first or input bundle of waveguides 206. In a similar manner, a second plurality of single mode optical waveguides 208 assembled to be substantially parallel to each other at the end and located within a sleeve 210 to form a second or output bundle of waveguides 212. If desired, and to be compatible with the material of the bundles, the sleeves 204, 210 can be composed of a glass material.

The single mode optical waveguides which make up the first or input bundle 206 can be considered to be coupled to receive optical signals from remote locations and, therefore, is referred to as the bundle of input waveguides. Similarly, the optical waveguides which make up the second bundle 212 can be considered to be coupled to distribute optical signals to remote locations and, therefore, is referred to as the bundle of output waveguides. Thus, the input waveguides make up bundle 206 and the output waveguides make up bundle 212.

The first bundle of optical waveguides 206 is axially aligned with the second bundle of optical waveguides 212 by means of a sleeve 214 to permit optical energy from the input waveguides to be received by the waveguides of the bundle of output waveguides.

Figure 3:
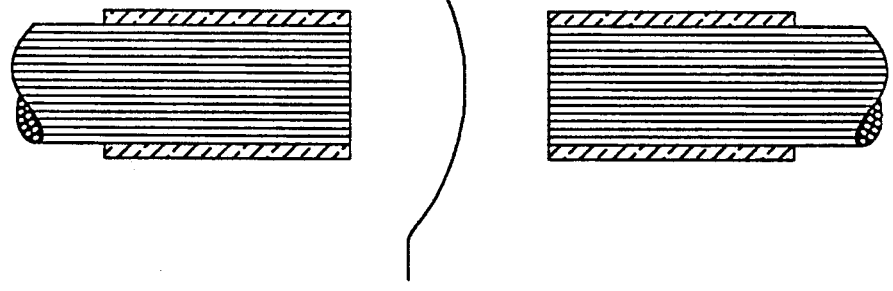
FIG. 3 illustrates a plot of the optical energy from a bundle of optical waveguides having a flat polished end surface.

Under normal circumstances, where the end face of a waveguide of the bundle of input waveguides is flat, the optical energy of that input waveguide of bundle 206 is gaussian. If a spherical lens is interposed between the two bundles of optical waveguides, each beam of optical energy directed from an input waveguide to an output waveguide will still be gaussian. Referring to FIG. 3, there is illustrated the shape of the optical energy from a bundle of input waveguides having flat end faces. Clearly, because the energy is Gaussian, not only do the waveguides at the center of the bundle of the output waveguides 208 receive more energy than those at the outer edge of the bundle, but a substantial amount of energy lies beyond the outer circumference of the bundle of output waveguides and, therefore, is lost.

Figure 4:
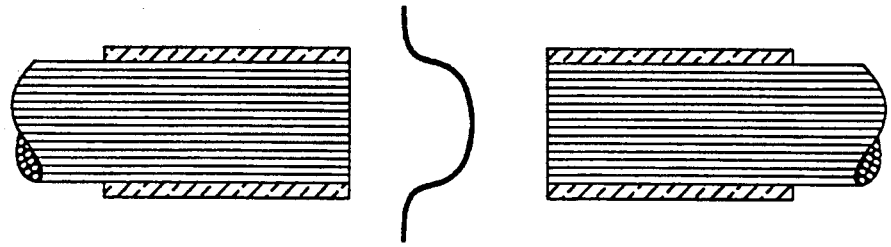
FIG. 4 illustrates the plot of a desired shape of optical energy from a polished end surface of a bundle of optical waveguides.

To avoid this problem, it is necessary to reshape the beam of optical energy to be uniform across the face of the bundle of the receiving waveguides, and to minimize the amount of optical energy that lies beyond the outer circumference of the bundle of output waveguides. FIG. 4 illustrates a desired shape of optical energy from the bundle of input waveguides where the optical energy that falls beyond the outer circumference of the bundle of the output waveguides is minimized.

Figure 5:
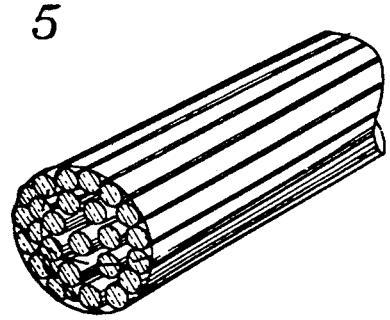
FIG. 5 illustrates a bundle of optical waveguides having a convex spherical polished end surface in accordance with the principles of the invention.

In the embodiment of the invention disclosed in FIG. 5, the optical energy from the bundle of input waveguides is controlled to be similar to the shape of FIG. 4. This optical energy distribution is obtained by shaping and polishing a convex spherical shape onto the end of the bundle of input waveguides. The diameter of the end of each waveguide is small relative to the diameter of the bundle of waveguides and, therefore, the very slight curvature on the end of each fiber functions as a wedge or bevel rather than as a lens to bend the optical energy from the end of the optical waveguide.

Figure 6:
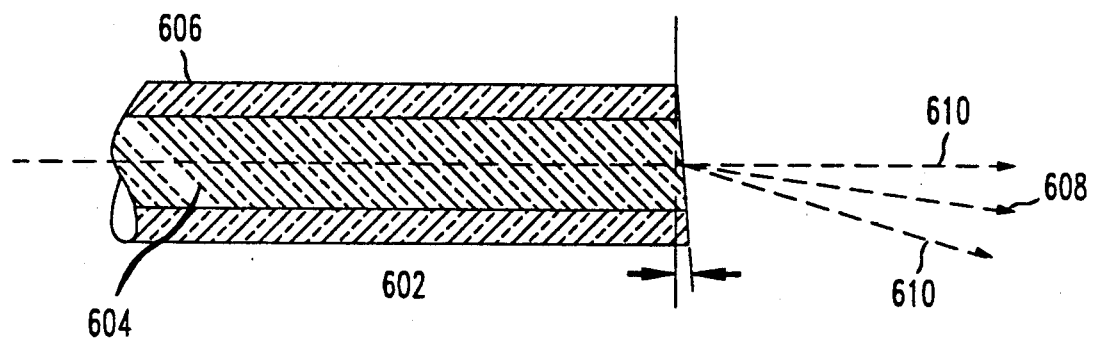
FIG. 6 illustrates the bending and divergence of optical energy as it leaves a shaped end of an optical waveguide.

Referring to FIG. 6, there is illustrated the bending of a beam of optical energy from a single waveguide 602 composed of a core 604 and a cladding 606 in accordance with the principles of the invention. It is to be noted that, as normally occurs, the beam of optical energy represented by dotted line 608 from the end of the optical waveguide also experiences a certain amount of divergence represented by dotted lines 610.

Figure 7:
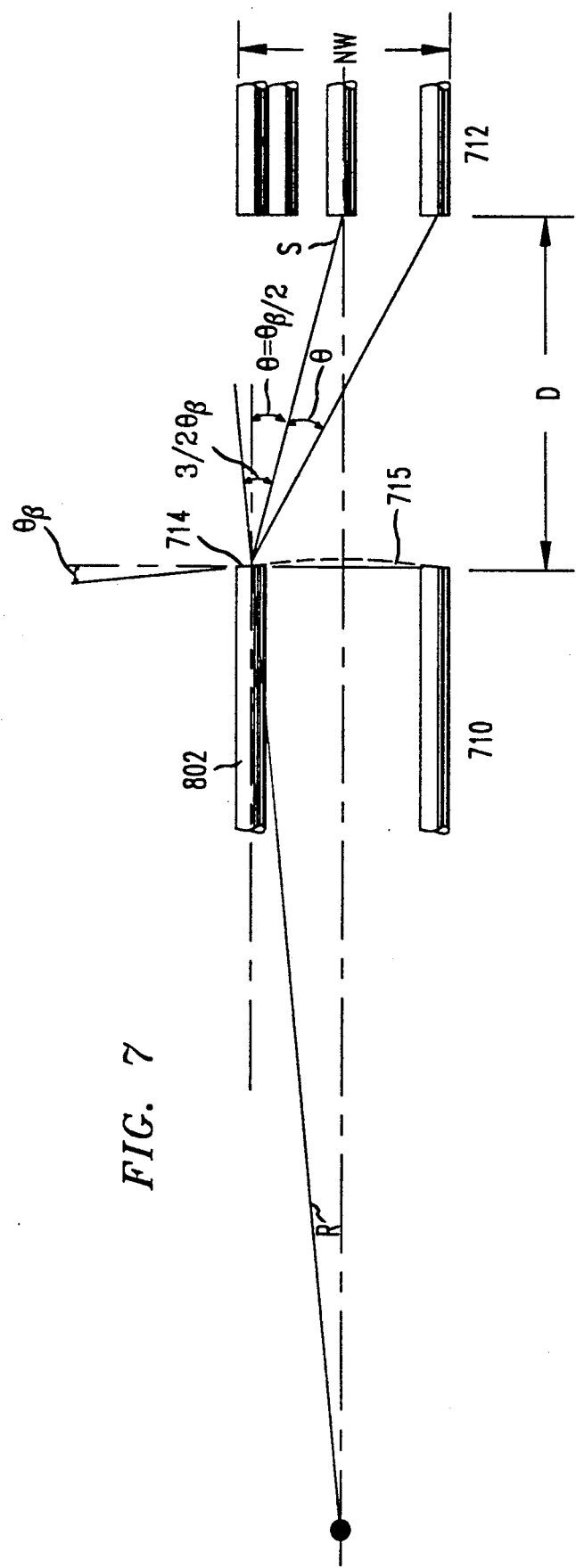
FIG. 7 illustrates an enlarged side view of the end section of an optical waveguide.

Referring to FIG. 7, there is illustrated a schematic representation of a specific embodiment of the inventive star coupler. The bundle of input optical waveguides 710 is aligned with and spaced from the bundle of output optical waveguides 712 by a distance D. The ends 714 of the input bundle is ground and polished to provide a convex spherical surface 715. This results in each fiber of the bundle having a shaped end facet. The end of the receiving bundle of optical waveguides is also ground and polished to have a desired shape which can be either flat or curved. In the embodiment disclosed, the end of the receiving bundle of optical waveguides is shaped to have the same convex spherical surface as that of the end of the input bundles of optical waveguides.

The spacing between the ends of the bundles of optical waveguides and the curvature of the ends of the bundles can be determined to provide optimum coupling. Referring to FIG. 7, using paraxial approximation and Snell's law, $$\theta = \frac{\lambda}{\pi n w}$$

where $\theta$ the half-angle of divergence of the mode energy from the end facet of the fiber;

n is the index of refraction of the space between bundles.

w is the mode field radius; and $\lambda$ is the wavelength of the optical energy;

$$D = \frac{NW}{(1/2)\theta}$$

where

D is the distance separating the bundle of input waveguides from the bundle of receiving waveguides such that the center waveguide of bundle 710 illuminates the entire receiving array of bundle 712, W is the outside diameter of an optical waveguide; and N is the number of fibers intersected by a straight line segment which passes through the center of the bundle.

The optical energy from the very center of each waveguide of the bundle of input waveguides should be directed to the center waveguide of the bundle of receiving waveguides. Referring to FIG. 7, the light beam from each waveguide, even the outer most waveguides should be directed toward the center waveguide. As illustrated, light beam S is directed to the center waveguide. To have the optical energy from fiber 802 fall on all of the waveguides of the bundle of receiving waveguides 712, the center of the beam of optical energy, designated by line S, is directed to the center of the bundle of receiving waveguides.

From FIG. 7, $$\theta_B = \frac{\frac{NW}{2}}{R} ; \text{ and } \frac{\theta_B}{2} = \theta$$

combining the above relationships to obtain R;

$$R = \frac{\pi n w N W}{4\lambda}$$

in which, w is the index of refraction of medium between the bundles.

N is the number of fibers intersected by a line through a diameter of the bundle;

w is the waist or mode field radius;

W is the outside diameter of the waveguide at the end of the bundle;

λ is the wavelength of the optical energy; and

R is the radius of the convex spherical surface of the bundle of fibers.

In the relationship above, the spacing D between the ends of the bundles of fibers should be large relative to the radius of the convex spherical surface R. For example, a spacing D relative to a radius R of substantially 20:1 was found to give good results.

Figure 8:
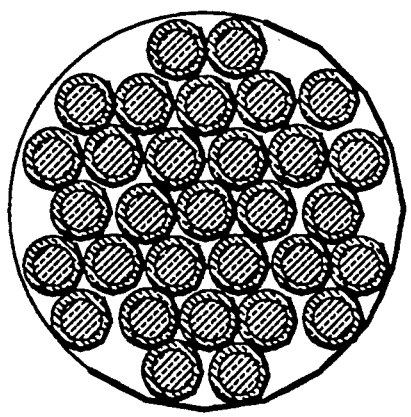
FIG. 8 illustrates an end view of a bundle of waveguide where each waveguide comprises a core and a cladding.
Figure 9:
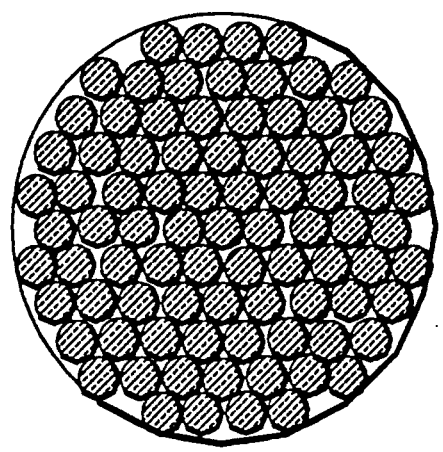
FIG. 9 illustrates an end view of a bundle of waveguide where each waveguide is comprised of a core and substantially no cladding.

To optimize the transfer of optical energy from the end facets of the bundle of input waveguides to the end facets of the bundle of output waveguides, the cores of the waveguides of the bundles should be positioned as close together as is possible. One method of increasing the packing density of the optical waveguides in the bundles is to chemically remove a substantial portion of the cladding of the waveguide. FIG. 8 illustrates the end view of a bundle of waveguides where each waveguide consists of a core and a cladding. In FIG. 9, which is an end view of the waveguides of a bundle, substantially all of the cladding of the waveguides has been removed and only the cores remain. Obviously, the packing density of the waveguides of FIG. 9 is greater than that of the bundle of FIG. 8. Other methods of increasing the packing density of the waveguides of a bundle is by tapering the core diameter of the single mode waveguides by drawing, also known as "downtaper; or by the diffusion of dopants in a single mode waveguide by heat treatment.

The packing density of the waveguides of a bundle is further increased when the waveguides are packed to form an hexagonal pattern. Thus, by modifying the ends of the waveguides by, for example, removing the cladding portion of a waveguide and by packing the waveguides to form an hexagonal pattern, the light collecting efficiency of the optical star coupler can be increased. Additionally, while the end of the bundle of the optical waveguides of the receiving bundle can be flat or curved, the light collecting efficiency of the optical star coupler is improved if the end of the bundle of the receiving waveguides is ground and polished to have the same convex spherical shape as that of the end of the bundle of the input waveguides.

When the filling factor of the bundle is increased by etching down the fiber to an outside diameter which is close to the mode field diameter (10 μm for standard fiber types), the fibers become difficult to bundle together because they are so thin. However, the mode field size of the fibers can be increased by a factor of three or more by heating the fibers in a furnace to a temperature of about 1300° C. for several hours. Thereafter, these fibers can be etched down to a size of 30–50 μm diameter, which is easier to handle. Alternatively, the fibers can first be etched to the desired outside diameter and bundled into a tube of silica or other high temperature material, and then the entire structure can be heat-treated to obtain adiabatic expansion of the modes of all the fibers.

A further advantage of using mode-expanded fiber is that the bundle to bundle separation can be increased to more easily accept other elements, such as filters or the like.

I claim:

1. A device for simultaneously transmitting optical signals from at least one of N input ports to N' output ports comprising a first plurality of single mode optical waveguides where each waveguide has an output end for emitting optical energy and an input end coupled to receive optical energy from at least one of said N input ports, the output ends of said first plurality of single mode optical waveguides are located along a three dimensional convex plane, a second plurality of single mode optical waveguides where each waveguide has an input end for receiving optical energy from the output end of at least one of said first plurality of single mode waveguides and an output end coupled to at least one of said N' output ports, the input ends of said second plurality of single mode optical waveguides are located along a plane, said output ends of said first plurality of single mode optical waveguides being positioned to face the input ends of said second plurality of single mode optical waveguides.

2. The device of claim 1 wherein the input ends of said second plurality of single mode optical waveguides are located along a three dimensional convex plane.

3. The device of claim 2 wherein the input ends of said second plurality of single mode optical waveguides are located along a three dimensional convex plane which is similar to that of said first plurality of single mode optical waveguides.

4. The device of claim 2 wherein the three dimensional convex plane of said output ends of said first plurality of waveguides and of said input ends of said second plurality of waveguides is defined by the relationship $$R = \frac{\pi n w N w W}{4\lambda}$$

where
R is the radius of the three dimensional convex plane;
n is the index of refraction of the cores of the single mode optical waveguides;
N is the number of waveguides alone a line which extends along a diameter of the output end of said first plurality of optical waveguides;
w is the beam waist;
W is the outside diameter of the output end of said first plurality of optical waveguides; and
λ is the wavelength of the optical energy transmitted by said optical waveguides.

5. The device of claim 4 wherein the output ends of said first plurality of single mode optical waveguides located along the three dimensional convex plane are positioned to form a hexagonal pattern and
the input ends of said second plurality of single mode optical waveguides located along the three dimensional convex plane are positioned to form a hexagonal pattern.

6. The device of claim 5 wherein the cladding on the output ends of said first plurality of single mode optical waveguides is less than the cladding normally surrounding the core of said waveguides to increase the packing density of the output ends at the three dimensional convex plane.

7. The device of claim 6 wherein the cladding on the input ends of said second plurality of single mode optical waveguides is less than the cladding normally surrounding the cores of said waveguides to increase the packing density of the input ends at the three dimensional convex plane.

8. The device of claim 7 wherein the cores at the output ends of said first plurality of single mode optical waveguides and at the input ends of said second plurality of single mode optical waveguides have adiabatic tapers where the larger diameter of said taper is at the end.

9. The device of claim 8 further comprising alignment means coupled to hold said first bundle of single mode optical waveguides in spaced axial and optical alignment with the second bundle of single mode optical waveguides.

10. The device of claim 7 wherein the output ends of said first plurality of single mode optical waveguides are longitudinally positioned side by side to form a first bundle,
the input ends of said second plurality of single mode optical waveguides are longitudinally positioned side by side to form a second bundle
said first bundle of single mode optical waveguides is aligned longitudinally with said second bundle of single mode optical waveguides, and
the output ends of said first plurality of single mode optical waveguides are positioned to face the input ends of said second plurality of single mode optical waveguides.

* * * * *